US012783209B2

(12) United States Patent
James et al.

(10) Patent No.: US 12,783,209 B2
(45) Date of Patent: Nov. 3, 2026

(54) AUDIO DEVICE WITH ULTRASOUND GUIDED PROCESSING, RELATED METHODS AND SYSTEMS

(71) Applicant: GN Audio A/S, Ballerup (DK)

(72) Inventors: Robert James, Ballerup (DK); Clément Laroche, Ballerup (DK)

(*) Notice: Subject to any disclaimer, the term of this patent is extended or adjusted under 35 U.S.C. 154(b) by 181 days.

(21) Appl. No.: 18/764,224

(22) Filed: Jul. 4, 2024

(65) Prior Publication Data

US 2025/0013426 A1 Jan. 9, 2025

(30) Foreign Application Priority Data

Jul. 6, 2023 (EP) .................................... 23183782

(51) Int. Cl.
*H04R 29/00* (2006.01)
*G01S 15/42* (2006.01)
*G06F 3/16* (2006.01)

(52) U.S. Cl.
CPC .............. *G06F 3/165* (2013.01); *G01S 15/42* (2013.01)

(58) Field of Classification Search
CPC ................................. G06F 3/165; G01S 15/42
USPC ...................................................... 381/56, 58
See application file for complete search history.

(56) References Cited

U.S. PATENT DOCUMENTS

2012/0224456 A1* 9/2012 Visser ..................... G01S 7/521 367/118
2016/0020697 A1* 1/2016 Janssens ................. H02M 3/07 323/271

FOREIGN PATENT DOCUMENTS

EP 2681586 B1 1/2014
WO 2018194661 A1 10/2018

* cited by examiner

*Primary Examiner* — Ammar T Hamid

(57) ABSTRACT

An audio device is disclosed comprising an interface, a memory, one or more processors comprising a signal processor, one or more speakers, one or more microphones, and an ultrasound device. The audio device is configured to output an output ultrasound signal via the ultrasound device; obtain an input ultrasound signal via the ultrasound device; obtain an audio input signal via the one or more microphones; determine, based on the audio input signal, a direction of arrival of the audio input signal; determine, based on the input ultrasound signal and the output ultrasound signal, position data including first position data indicative of a first position of a first moving object; determine whether the direction of arrival satisfies a position criterion based on the first position data; process the audio input signal based on whether the direction of arrival satisfies the position criterion for provision of an audio output signal.

15 Claims, 4 Drawing Sheets

AUDIO DEVICE WITH ULTRASOUND GUIDED PROCESSING, RELATED METHODS AND SYSTEMS

BACKGROUND

The present disclosure pertains to the field of audio devices, and in particular to audio devices with ultrasound guided processing and related methods.

An audio device, e.g., a speakerphone, can improve a signal to noise ratio, SNR, by using a plurality of microphones and signal processing techniques. It is possible to detect the direction of arrival of an audio source to determine where in the azimuth plane the audio source is located. A limitation of current direction of arrival, DOA, processing pipeline is that it is difficult to evaluate the distance from the audio source to the microphone using just audio signals.

SUMMARY

A further limitation with a system relying on audio to detect and locate a sound source, is that it requires a user associated with the sound source to interact with the audio device to be detected. Thus, a silent speaker will not be detected. When a camera is available, some of such detection can be achieved by processing the camera stream, however the processing of a high-resolution video (such as 4K) is costly and not always feasible in resource constrained applications.

Accordingly, there is a need for audio devices and methods with ultrasound guided processing, which may mitigate, alleviate, or address the shortcomings existing and may provide for a more precise and/or targeted detection of one or more audio sources of interest in an environment where an audio device is positioned.

An audio device is disclosed. The audio device comprises an interface, a memory, one or more processors comprising a signal processor, one or more speakers, one or more microphones, and an ultrasound device. The audio device is configured to output an output ultrasound signal via the ultrasound device. The audio device is configured to obtain an input ultrasound signal via the ultrasound device. The audio device is configured to obtain an audio input signal via the one or more microphones. The audio device is configured to determine, based on the audio input signal, a direction of arrival of the audio input signal. The audio device is configured to determine, based on the input ultrasound signal and the output ultrasound signal, position data including first position data indicative of a first position of a first moving object. The audio device is configured to determine whether the direction of arrival satisfies a position criterion based on the first position data. The audio device is configured to process the audio input signal based on whether the direction of arrival satisfies the position criterion for provision of an audio output signal.

Further, a conference system is disclosed. The conference system comprises an audio device as disclosed herein, and one or more ultrasound transducers as disclosed herein.

A method of operating an audio device is disclosed, such as an audio device as disclosed herein. The method comprises outputting an output ultrasound signal via the ultrasound device. The method comprises obtaining an input ultrasound signal via the ultrasound device. The method comprises obtaining an audio input signal via the one or more microphones. The method comprises determining, based on the audio input signal, a direction of arrival of the audio input signal. The method comprises determining, based on the input ultrasound signal and the output ultrasound signal, position data including first position data indicative of a first position of a first moving object. The method comprises determining whether the direction of arrival satisfies a position criterion based on the first position data. The method comprises processing the audio input signal based on whether the direction of arrival satisfies the position criterion for provision of an audio output signal.

The present disclosure provides an audio device capable of performing distance aware processing of input audio signals. It may be appreciated that the present disclosure allows for targeted audio processing of audio sources, and in turn distance-dependent targeting of audio sources, e.g., by using ultrasound guided processing. The audio device may provide improved detection of one or more audio sources by using audio signals and ultrasound signals. For example, the audio device may be able to accurately determine a distance between an audio source and the audio device using both the ultrasound signals and the audio signals, in turn improving speech quality and intelligibility.

The disclosed conference system, audio device, and related method provide detection of one or more moving objects, thereby enabling a more natural meeting experience. In other words, such movement detection may provide for a more flexible interaction between a user and the audio device, by allowing the user to interact with the audio device without having to speak, e.g., by raising and/or waving hand.

By knowing approximate number of users utilizing the audio device and respective movement, the present disclosure may allow an improved tune of the processing pipeline, in turn improving the detection of one or more audio sources of interest in various acoustic conditions. The present disclosure may provide improved speech quality of an output audio signal outputted to a far-end, such as a transmitted audio signal. In other words, the present disclosure may provide an improved audio quality of speech at the far-end, e.g., during a call or a meeting.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
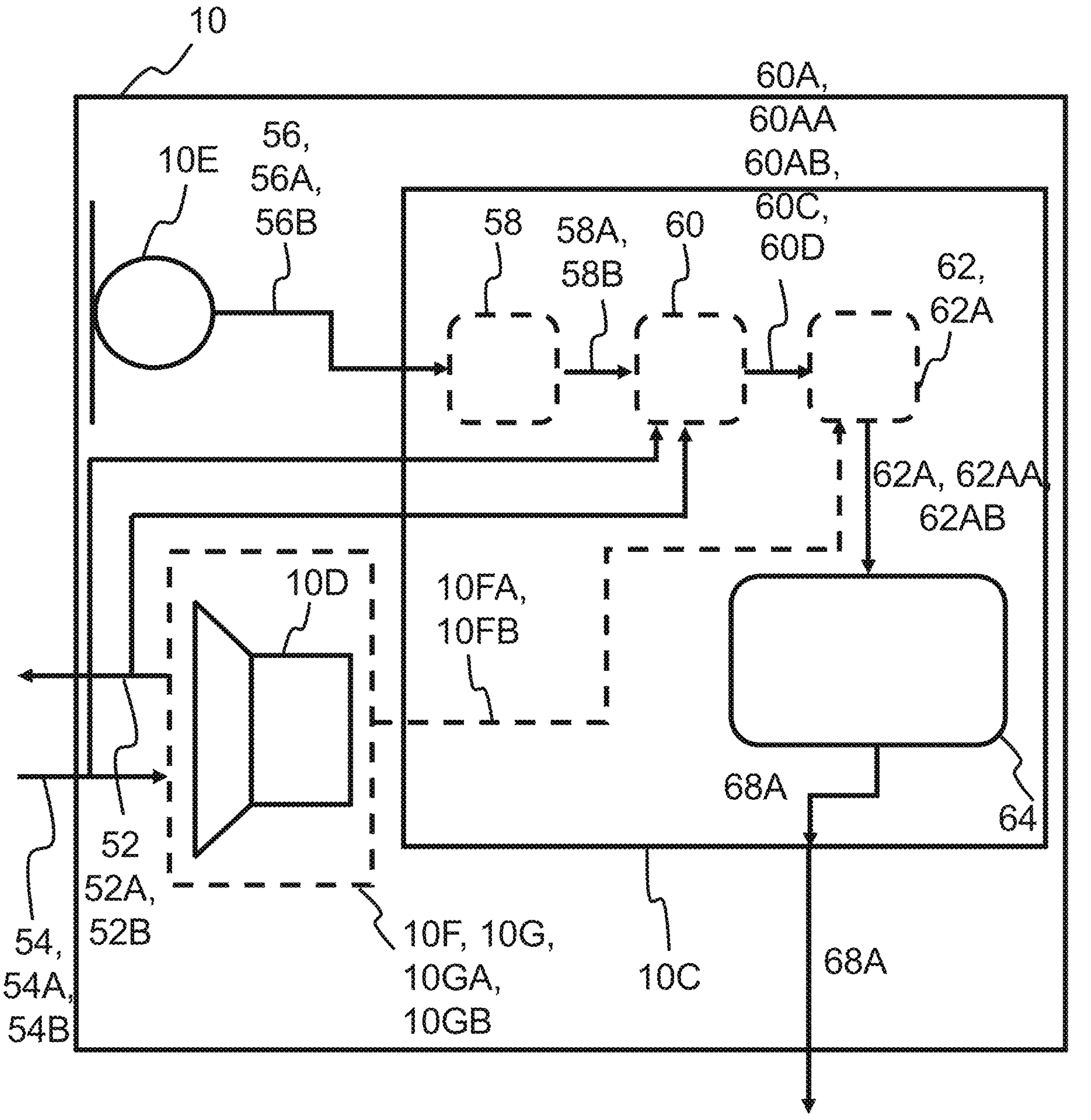
FIG. 1 schematically illustrates an example audio device according to the present disclosure, FIG. 2 schematically illustrates an example scenario where the disclosed technique is applied.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

A conference system is disclosed. The conference system comprises an audio device and one or more ultrasound transducers as disclosed herein. In one or more example conference systems, the one or more ultrasound transducers are positioned at different positions in a meeting room. The conference system may be seen as a speakerphone system. The conference system may be seen as a speakerphone system for performing calls, such as audio and/or video calls. The conference system, such as speakerphone system, may be seen as a system with ultrasound guided processing.

An audio device is disclosed. The audio device as disclosed herein may comprise an interface, a memory, one or more processors comprising a signal processor, one or more speakers, one or more microphones, and an ultrasound device.

In one or more example audio devices, the audio device may comprise one or more interfaces, one or more processors, and one or more memories. Further, the audio device may comprise one or more microphones, such as a first microphone, optionally a second microphone, optionally a third microphone and optionally a fourth microphone. The audio device may comprise one or more speakers, such as audio speakers, e.g., loudspeaker(s).

The audio device may be seen as a speakerphone. The audio device may be configured to obtain audio signals, output audio signals, and process audio signals. The audio device may be seen as a conference audio system, e.g., a conference speakerphone, e.g., configured to be used by a party (such as one or more users at a near-end) to communicate with one or more other parties (such as one or more users at a far-end). The audio device may be seen as a smart audio device, e.g., a smart speakerphone. The audio device may be used for a conference and/or a meeting between two or more parties being remote from each other. The audio device may be used by one or more users in a vicinity of where the audio device is located, also referred to as a near-end.

The audio device may be a single audio device. The audio device may be seen as a plurality of interconnected audio device, such as a conference system. The conference system may comprise one or more users. It is noted that the term speaker may be seen as the user of the audio device. The audio device may be configured to process one or more audio signals. Optionally, the audio device can be configured to output audio signals. The audio device may be configured to obtain, such as to receive via the interface and/or the one or more microphone(s), the audio signals.

In one or more example audio devices, the interface comprises a wireless transceiver, also denoted as a radio transceiver, and an antenna for wireless transmission and reception of an audio signal, such as for wireless transmission of the output signal and/or wireless reception of a wireless input signal. The audio device may be configured for wireless communication with one or more electronic devices, such as a speakerphone, a smartphone, a tablet, a computer and/or a smart watch. The audio device optionally comprises an antenna for converting one or more wireless input audio signals to antenna output signal(s). The conference system, the audio device, and/or electronic devices may be configured for wireless communications via a wireless communication system, such as short-range wireless communications systems, such as Wi-Fi, Bluetooth, Zigbee, IEEE 802.11, IEEE 802.15, infrared and/or the like.

The conference system and/or the audio device may be configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, millimeter-wave communications, such as millimeter-wave communications in licensed bands, such as device-to-device millimeter-wave communications in licensed bands.

In one or more example conference systems, audio devices and/or electronic devices, the interface of the audio device comprises one or more of: a Bluetooth interface, Bluetooth low energy interface, and a magnetic induction interface. For example, the interface of the electronic device and/or the interface of the audio device may comprise a Bluetooth antenna and/or a magnetic interference antenna.

In one or more example audio devices, the interface may comprise a connector for wired communication, via a connector, such as by using an electrical cable. The connector may connect one or more microphones to the audio device. The connector may connect the audio device to an electronic device, e.g., for wired connection.

The one or more interfaces can be or comprise wireless interfaces, such as transmitters and/or receivers, and/or wired interfaces, such as connectors for physical coupling. For example, the audio device may have an input interface configured to receive data, such as a microphone input signal. In one or more example audio devices, the audio device can be used for all form factors in all types of environments, such as for headsets and/or video conference equipment. For example, the audio device may not have a specific microphone placement requirement. In one or more example audio devices, the audio devices may comprise an external microphone, such as external microphones positioned at a plurality of positions in the environment of the audio device.

An audio device, the audio device comprising an interface, a memory, one or more processors comprising a signal processor, one or more speakers, one or more microphones, and an ultrasound device. In one or more example audio devices, the ultrasound device comprises one or more ultrasound transducers. The ultrasound device may be seen as a device configured to emit, generate, and/or output ultrasound signals. The ultrasound device may be configured to emit, generate, and/or output ultrasound pulses and/or bursts.

In one or more example audio devices, the ultrasound device may be configured to obtain or receive input ultrasound signals. The audio device is configured to: output an output ultrasound signal via the ultrasound device; obtain an input ultrasound signal via the ultrasound device; obtain an audio input signal via the one or more microphones; determine, based on the audio input signal, a direction of arrival of the audio input signal; determine, based on the input ultrasound signal and the output ultrasound signal, position data including first position data indicative of a first position of a first moving object; determine whether the direction of arrival satisfies a position criterion based on the first position data; and process the audio input signal based on whether the direction of arrival satisfies the position criterion for provision of an audio output signal.

Optionally, the ultrasound device can be seen as a speaker, with one or more microphones being used for obtaining the ultrasound input signal. Put differently, an ultrasound transducers may comprise one or more speakers and one or more microphones, where the speaker(s) and the microphone(s) act as ultrasound transducer. It may be appreciated that the speaker(s) may act as the ultrasound emitting or generating device and the microphone(s) may act as the ultrasound receiving device.

The audio device is configured to output an output ultrasound signal via the ultrasound device. In one or more example audio devices, the ultrasound device is configured to generate and/or output an output ultrasound signal, e.g. a first output ultrasound signal, a second output ultrasound signal and/or a third output ultrasound signal. The output ultrasound signal may be seen as a sound wave and/or an ultrasound wave in the ultrasound spectrum.

The audio device is configured to obtain an input ultrasound signal via the ultrasound device. In one or more example audio devices, the input ultrasound signal can be seen as a reflected ultrasound signal, such as an echo signal. In other words, the input ultrasound signal may be seen as a reflected version of the output ultrasound signal, such as reflected in the environment of the audio device. In one or more example audio devices, the input ultrasound signal can be seen as one or more reflected ultrasound signals, e.g. a first reflected ultrasound signal, a second reflected ultrasound signal and/or a third reflected ultrasound signal. For example, upon encountering an obstacle, the output ultrasound signal is reflected back to the audio device, such as to the ultrasound device, for provision of the input ultrasound signal. The input ultrasound signal may comprise a part of the energy of the output ultrasound signal that has been reflected in the environment of the audio device.

The audio device is configured to obtain an audio input signal via the one or more microphones. In one or more example audio devices, the audio device is configured to obtain an audio input signal, e.g. comprising a first input signal, a second input signal, and/or a third input signal, via the one or more microphones, e.g. a first microphone, a second microphone and/or a third microphone. In one or more example audio devices, the audio device may be configured to obtain the first audio input signal using the first microphone, the second audio input signal using the second microphone, and/or the third audio input signal using the third microphone. The first audio input signal, the second audio input signal, and/or the third audio input signal may be combined and be seen as the audio input signal.

In one or more example audio devices, an audio input signal is indicative of an audio signal generated by user(s), people, or other sound sources in the environment of the audio device, such as in the conference system. In one or more example audio devices, an audio input signal can be indicative of an audio signal generated by the user(s) of the audio device while using the audio device. Put differently, an audio input signal may be indicative of user speech. In one or more example audio devices, an audio input signal can comprise one or more of the user's speech, interfering speech, echo, and noise, such as ambient noise, continuous noise, intermittent noise, impulsive noise, and/or low-frequency noise.

The audio device is configured to determine, based on the audio input signal, a direction of arrival, DOA, of the audio input signal. In one or more example audio devices, the audio device is configured to determine, based on the first audio input signal, a first DOA of the first audio input signal. In one or more example audio devices, the audio device is configured to determine, based on the second audio input signal, a second DOA of the second audio input signal. In one or more example audio devices, the audio device is configured to determine, based on the third audio input signal, a third DOA of the third audio input signal. In one or more example audio devices, the DOA of the audio input signal comprises the first DOA, the second DOA, and the third DOA. In one or more example audio devices, the first DOA, the second DOA, and the third DOA may be combined and be seen as the DOA of the audio input signal. It may be appreciated that the audio device may be configured to determine one or more DOAs depending on the number audio sources in the environment of the audio device. The DOA of the audio input signal may be determined in various ways. For example, the DOA may be determined using one or more of the following techniques: time difference of arrival, TDOA, beamforming by analyzing intensity across a beam, cross-correlation of audio signals, spectral analysis by analyzing frequency content of an audio input signal, and machine learning techniques.

The audio device is configured to determine, based on the input ultrasound signal and the output ultrasound signal, position data including first position data indicative of a first position of a first moving object, e.g. a first non-static object. In one or more example audio devices, the position data comprises a distance and/or a direction in view of the audio device. In one or more example audio devices, the first position data comprises a distance between the first moving object and the audio device and/or a direction associated with the first moving object in relation to the audio device.

It may be appreciated that the audio device may be configured to receive the reflected version of the output ultrasound signal, such as the input ultrasound signal, when the output ultrasound signal has encountered the first moving object. The audio device may be configured to determine a time interval between outputting the output ultrasound signal and obtaining the input ultrasound signal. For example, such time interval can be converted into a corresponding distance, such as the distance between the audio device and the first moving object. For example, to determine position data may comprise to determine position data, such as distance to a moving object, using time-of-flight, ToF, measurements of the ultrasound signals and/or using Doppler shift detection. The audio device may be configured to determine an angle interval between an angle associated with transmission of the output ultrasound signal, such as an angle of departure, and an angle associated with reception of the input ultrasound signal, such as an angle of arrival. For example, such angle interval can be converted into a corresponding direction, such as the direction associated with the first moving object in relation to the audio device. For example, to determine position data may comprise to determine position data, such as a direction of arrival or angle of arrival of a reflected ultrasound signal on a moving object, using phased array ultrasound measurements of the ultrasound signals. Alternatively or additionally, a direction of arrival of a reflected ultrasound signal on a moving object may be determined based on the ultrasound transducer outputting and obtaining the ultrasound signals. For example, an ultrasound transducer may have a range of detection where a moving object can be detected. The direction of arrival of a reflected ultrasound signal on a moving object may therefore be seen as a direction range.

In one or more example audio devices, the first moving object can be seen as a first moving person, such as a person not necessarily speaking. For example, the first moving person can be moving, e.g. raising his hand, but not speaking. In one or more example audio devices, the present disclosure allows detection of small movements from a "still" object, e.g. a "still" person and/or user but who will still make very small movements that can be detected. In one or more example audio devices, the first moving object can be seen as an obstacle to propagation of the output ultrasound signal. The first moving object may be seen as an object in the vicinity or environment of the audio device, such as in a vicinity of ultrasound detection from the audio device.

The audio device is configured to determine whether the direction of arrival, DOA, satisfies a position criterion based on the first position data. In one or more example audio devices, the audio device is configured to determine whether the DOA satisfies a position criterion based on the first position data and/or the second position data. The position criterion may be determined based on the first position data, such as based on the first distance and/or the first direction. It may be appreciated that the position criterion may vary depending on the first position data. The position criterion may be based on the first position of the first moving object. To determine whether the DOA satisfies the position criterion may comprise to determine whether a distance from the audio device and/or a direction with respect to the audio device of the audio source associated with the DOA satisfies the position criterion. In one or more example audio devices, the position criterion is dynamic depending on whether the DOA is associated with the first moving object. The position criterion may comprise a distance threshold and/or an angle range threshold.

Thereby it may be possible to differentiate between a moving object emitting a sound and a static object emitting a sound. For example, it may be desirable to target an audio source being a person speaking and therefore also being non-static, but on the other hand attenuate noise from a machine being static. Therefore, the position criterion may vary in distance for example depending on the nature of the audio source. In one or more example audio devices, the position criterion is user defined. For example, a user of the audio device may pre-determine one or more conditions to be included in the position criterion. For example, the user may set a distance threshold and/or a direction threshold to be included in the position criterion. For example, the user may set distance range threshold of 5 meters from the audio device. For that example, the audio device would attenuate audio sources located at more than 5 meters from the audio device. Another example could be that the user sets a direction range threshold of 0° to 180° with respect to the audio device, such as a reference position of the audio device. For that example, the audio device would attenuate audio sources located in a direction range from more 180° to 360° with respect to the audio device. For example, if 0° to 180° is a frontal hemisphere with respect to the audio device, such as "in front" of the audio device, 180° to 360° may be a back hemisphere with respect to the audio device, such as "behind" the audio device.

The audio device may be configured to determine whether the first position data is associated with or relating to the DOA of the audio input signal or with an audio source associated with the DOA. For example, when a first person emits a sound from a certain position with respect to the audio device, the audio device may determine the DOA of the sound emitted by the first person, e.g., by processing the audio input signals. Then the audio device may determine first position data of the first person, or at least position data in a direction range around the first person, by using ultrasound. The audio device may then determine whether the DOA comes from a direction where the first position data satisfies the position criterion. In other words, the audio device may determine whether the DOA comes from a direction where the first position of the first moving object satisfies the position criterion. For example, the DOA may satisfy the position criterion when the first person emitting the sound has a first position satisfying the position criterion. The audio device may be configured to match the DOA with the position data in order to determine the first position data associated with the DOA. In other words, the audio device may be configured to determine whether the DOA is associated with the first moving object, and if yes the audio device may be configured to determine whether the first position data satisfies the position criterion.

The audio device is configured to process the audio input signal based on whether the direction of arrival, DOA, satisfies the position criterion for provision of an audio output signal. In other words, the audio device is configured to process the audio input signal based on an outcome of the determination of whether the DOA satisfies the position criterion. Formulated differently, the processing of the audio input signal may vary depending on whether the DOA satisfies the position criterion or not. In one or more example audio devices, to process the audio input signal comprises to determine the audio output signal based on an outcome of the determination of whether the DOA satisfies the position criterion, such as in accordance with the outcome. In one or more example audio devices, the audio device is configured to process the audio input signal in accordance with an outcome of such determination. In one or more example audio devices, the audio device is configured to output the audio output signal via one or more interfaces, e.g., output the audio output signal to a far-end audio device.

An example where the technique as disclosed herein is applied may be as follows:

The audio device is located in a meeting room with a plurality of persons in the room. The audio device outputs an output ultrasound signal via the ultrasound device, such as outputs one or more ultrasound pulses or bursts in the meeting room.

The audio device obtains an input ultrasound signal via the ultrasound device, where the input ultrasound signal is a reflection of the output ultrasound signal. The audio device obtains an audio input signal via the one or more microphones, such as obtains audio input signal indicative of speech from a first person in the meeting room.

The audio device determines, based on the audio input signal, a direction of arrival of the audio input signal, such as a direction of arrival of the speech of the first person.

The audio device determines, based on the input ultrasound signal and the output ultrasound signal, position data including first position data indicative of a first position of a first moving object. For example, the audio device determines first position data indicative of a first position of the first person being the first moving object.

The audio device determines whether the direction of arrival satisfies a position criterion based on the first position data. For example, the audio device determines whether the direction of arrival of the speech of the first person is within a first direction range with respect to the audio device and determined by the position criterion and associated with the first position of the first person. In other words, the audio device determines whether the first position of the first person is within a certain direction range and/or distance range with respect to the audio device which is determined by the position criterion. The audio device processes the audio input signal based on whether the direction of arrival satisfies the position criterion for provision of an audio output signal. For example, when the first position of the first person is within a certain direction range and/or distance range with respect to the audio device, the audio device targets the first person, such as targets audio signals coming from the direction of the first person.

In one or more example audio devices, to process the audio input signal comprises, in accordance with the direction of arrival satisfying the position criterion, to target an audio source associated with the direction of arrival. In one or more example audio devices, the audio device is configured to target the audio source associated with the DOA when the DOA satisfies the position criterion. In one or more example audio devices, the audio device is configured to target parts of the audio input signal coming from the DOA. The audio device may be configured to target an audio source based on its distance from the audio device. The audio device may be configured to target the audio source by controlling a beamformer of the audio device to beamform in a direction range generally in direction of the DOA. To target an audio source associated with the DOA may be seen as flagging an audio source associated with the DOA. In other words, the audio device may be configured to filter out parts of the audio input signal not coming from the DOA. To target an audio source may be seen as isolating or extracting a specific sound or audio signal of interest from a mixture or recording that contains multiple audio sources. To target an audio source may comprise to use one or more of: noise reduction, source separation, audio enhancement, beamforming, spectral subtraction, adaptive filtering, audio transcription, and machine learning algorithms.

The term “targeting” may be seen as directing attention or focusing on a particular audio source to extract or manipulate it selectively. This can involve various algorithms and signal processing techniques designed to isolate the desired audio source while minimizing the influence of other unwanted sources or background noise. This may allow to enhance the quality or intelligibility of the target audio source or to separate it for further analysis or processing.

In one or more example audio devices, upon determining that the direction of arrival satisfies the position criterion, the audio device is configured to forward the audio input signal to the signal processor, such as to a digital signal processor, DSP, for processing the audio input signal.

In one or more example audio devices, to process the audio input signal comprises, in accordance with the direction of arrival not satisfying the position criterion, to attenuate an audio source associated with the direction of arrival. In one or more example audio devices, the audio device is configured to attenuate an audio source associated with the direction of arrival when the direction of arrival does not satisfy the position criterion. In one or more example audio devices, the audio device is configured to filter out parts of the audio input signal coming from the DOA. Stated differently, the audio device may be configured to attenuate one or more audio sources associated with the audio input signal coming from the DOA. This may for example be noise in the environment of the audio device not being a user of the audio device or speech from a person not using the audio device. Another example may be that the audio source associated with the DOA is too far from the audio device and/or in a direction range with respect to the audio device where no user of the audio device is located. The present disclosure therefore allows for attenuating audio sources that do not satisfy the position criterion.

In one or more examples audio devices, the audio output signal can be seen as an audio signal associated with one or more audio sources of interest, such as audio sources associated with a DOA satisfying the position criterion.

In one or more example audio devices, the first position data comprises a first distance and a first direction of the first moving object. In one or more example audio devices, the first position data comprises the first distance, such as a distance between the first moving object and the audio device, and/or a first direction, such as a direction associated with the first moving object in relation to the audio device. The first direction may be seen as a direction associated with the first moving object in relation to the ultrasound device and/or in relation to the ultrasound transducer performing the measurement. In other words, the first direction may be seen as a direction associated with the first moving object in relation to the ultrasound device having a width corresponding to emission and/or propagation of ultrasound signals, such as the output and/or input ultrasound signals, of the one or more ultrasound transducers. In one or more example audio devices, the first distance may be seen as a distance between the first moving object and the ultrasound device and/or the ultrasound transducer performing the measurement. Stated differently, the first distance may be seen as a distance determined based on an output power of the one or more ultrasound transducers. In one or more example audio devices, the first distance can be an approximate value, such as a value within a distance range. The distance range may be seen as a portion of the environment where the audio device is positioned within which one or more audio sources are targeted.

In one or more example audio devices, to determine whether the direction of arrival satisfies the position criterion comprises to determine whether the direction of arrival is within a first direction range associated with the first direction and/or whether the first distance is within a distance range, such as a first distance range. In one or more example audio devices, the audio device is configured to determine that the direction of arrival satisfies the position criterion when the audio device determines that the direction of arrival is within the first direction range associated with the first direction and/or the first distance is within the distance range. The audio device may be configured to provide the input audio signals detected within the distance range for provision of the output audio signal. In one or more example audio devices, the audio device is configured to determine that the direction of arrival does not satisfy the position criterion when the audio device determines that the direction of arrival is not within the first direction range associated with the first direction and/or the first distance is not within the distance range. The audio device may be configured to attenuate parts of the input audio signals determined to be outside the distance range. In one or more example audio devices, the distance range may be associated with and/or comprise a distance threshold. The position criterion may be based on or comprise the distance range. It may be appreciated that the distance threshold may vary depending on the direction with respect to the audio device. For example, the distance threshold may be larger or smaller in certain directions with respect to the audio device. The distance range may comprise a set of distances from the audio device less than or equal to the distance threshold depending on the direction with respect to the audio device. For example, the distance range can be seen as a bubble distance, such as a distance from the audio device. The distance range may create a so called pick-up bubble around the audio device. The audio device may be configured to target audio sources inside the pick-up bubble and attenuate the audio sources outside the pick-up bubble. The distance range may be associated with a circular shape, such as a circular bubble, such that the distance threshold is the boundary of the circular shape. The distance range may be associated with any other suitable shape. In one or more example audio devices, the distance range can be determined and/or varied based on an output power of the one or more ultrasound transducers.

In one or more example audio devices, the audio device is configured to determine the position criterion based on the first distance and/or the first direction. In other words, the audio device may be configured to determine the position criterion as a function of the first distance and/or the first direction, where the first distance and/or the first direction are used as input in the determination of the position criterion. It may be appreciated that by determining the position criterion based on the first distance and/or the first direction the position criterion is dynamic. In one or more example audio devices, the position criterion may be user defined, such as dependent on one or more positions of one or more users. For example, the position criterion may be based on the one or more sources of interest being associated with one or more users. The position criterion may be based on a mapping of one or more sources of interest, such as mapping of one or more users of the audio device. For example, the audio device is configured to determine a dynamic distance range, such as a dynamic bubble, based on the first distance and/or the first direction of the first moving object.

In one or more example audio devices, the processing of the audio input signal is based on the first position data and/or the second position data. The first position data and/or the second position data may be used for mapping of audio sources of interest, such as mapping of one or more users of interest. In one or more example audio devices, the present audio device allows user mapping using ultrasound signals and processing the audio input signal based on the mapping. For example, the audio device is configured to detect and/or map a user, such as a first moving object and/or a second moving object, using ultrasound signals, such as using the output ultrasound signal and the input ultrasound signal, for provision of position data, such as the first position data and/or the second position data. For example, the audio device is configured to process the audio input signal based on such detection and/or mapping. An advantage of processing the audio input signal based on the first position data and/or the second position data is that the audio device may be capable of anticipating where audio signals of interest may come from. For example, a user or person raising his/her hand in a meeting may be detected by the audio device as a moving object within a distance range of interest from the audio device, and thereby the audio device may target the direction to this user before this person starts speaking.

In one or more example audio devices, to process the audio input signal comprises to target the first moving object and/or the second moving object. In other words, the first moving object and/or the second moving object may be located within the distance range from the audio device. The audio device may be configured to target the audio source by controlling a beamformer of the audio device to beamform in a direction range generally in direction of the first moving object and/or the second moving object. To target the first moving object and/or the second moving object may be seen as flagging an audio source of interest in direction of the first moving object and/or the second moving object. In other words, the audio device may be configured to filter out parts of the audio input signal not coming from the first moving object and/or the second moving object.

In one or more example audio devices, the position data comprises second position data indicative of a second position of a second moving object, wherein the second position data comprise a second distance and a second direction of the second moving object, e.g. a second non-static object. In one or more example audio devices, the second position data comprises a distance between the second moving object and the audio device and/or a direction associated with the second moving object in relation to the audio device. In other words, the second position data comprise the second distance and the second direction of the second moving object, such as from the audio device. In one or more example audio devices, the second moving object can be seen as a second moving person. The second moving object may be different from the first moving object. The second moving object may for example be a second moving person in the environment of the audio device. The description relating to the first moving object may also equivalently apply to the description of the second moving object but where the second moving object is different from the first moving object. Formulated differently, the audio device may be configured to determine whether the DOA matches with position data for each detected moving object. When the audio device has matched the DOA with a detected moving object in the environment of the audio device, the audio device is configured to determine whether the moving object is within a certain distance and/or direction with respect to the audio device.

In one or more example audio devices, to determine whether the direction of arrival satisfies the position criterion comprises to determine whether the direction of arrival is within a second direction range associated with the second direction and whether the second distance is within a distance range, such as a second distance range. In one or more example audio devices, the audio device is configured to determine that the direction of arrival satisfies the position criterion when the audio device determines that the direction of arrival is within the second direction range associated with the second direction and the second distance is within the distance range. In one or more example audio devices, the audio device is configured to determine that the direction of arrival does not satisfy the position criterion when the audio device determines that the direction of arrival is not within the second direction range associated with the second direction and/or the second distance is not within the distance range. In one or more example audio devices, the distance range may be associated with a distance threshold. The distance range may comprise a plurality of distances from the audio device less than or equal to the distance threshold. For example, the distance range can be seen as a bubble distance, such as a distance from the audio device. The distance range may be associated with a circular shape, such as a circular bubble, such that the distance threshold is the boundary of the circular shape. The distance range may be associated with any other suitable shape. In one or more example audio devices, the distance range can be determined based on a power of the one or more ultrasound transducers. Thereby it may for example be possible to differentiate between a moving object emitting a sound and a static object emitting a sound, e.g., by having different distance ranges. For example, it may be desirable to target an audio source being a person speaking and therefore also being non-static, but on the other hand attenuate noise from a machine being static. Therefore, the position criterion may vary in distance for example depending on the nature of the audio source. Formulated differently, the audio device may be configured to determine whether the DOA matches with position data for each detected moving object, such as the first moving object and the second moving object. When the audio device has matched the DOA with a detected moving object in the environment of the audio device, the audio device is configured to determine whether the moving object is within a certain distance and/or direction with respect to the audio device.

In one or more example audio devices, the distance range is less or equal to 10 meters from the audio device. For example, the distance threshold is a distance of 10 meters from the audio device, such as within 10 meters of the audio device. The distance range may be less or equal to 8 meters, such as less or equal to 5 meters, or less or equal to 3 meters from the audio device. To determine whether the direction of arrival satisfies the position criterion may comprise to determine whether the audio source associated with the direction of arrival is within a distance range less or equal to 10 meters, such as less or equal to 8 meters, less or equal to 5 meters, or less or equal to 3 meters from the audio device. In other words, the position criterion may be based on or comprise the distance range. For example, the position criterion may comprise a distance range criterion.

The audio device may be configured only to target audio sources associated with DOAs within the distance range, such as within a distance range less or equal to 10 meters, such as less or equal to 8 meters, less or equal to 5 meters, or less or equal to 3 meters from the audio device. Formulated differently, the audio device may be configured to attenuate audio sources associated with DOAs outside the distance range, such as outside a distance range more than 10 meters, such as more than 8 meters, more than 5 meters, or more than 3 meters from the audio device.

In one or more example audio devices, to determine the position data comprises to determine one or more amplitude variations based on the input ultrasound signal and the output ultrasound signal. In other words, the audio device may be configured to compare the input ultrasound signal with the output ultrasound signal to determine one or more amplitude variations. To determine one or more amplitude variations may comprise to process the input ultrasound signal and the output ultrasound signal. For example, to determine one or more amplitude variations may comprise to perform Goertzel frequency analysis of the input ultrasound signal and the output ultrasound signal. For example, a Goertzel frequency analysis may comprise one or more of: to analyze specific frequencies, list additions generated for each tone group frequency (e.g., tone and sidebands), add frequencies within one or more tone group frequencies (e.g., plus/minus maximum doppler shift), and ignore one or more tone group frequencies in list. In one or more example audio devices, the one or more amplitude variations can indicate detection of the first moving object and/or the second moving object by the audio device, such as using the ultrasound device.

In one or more example audio devices, the ultrasound device comprises one or more ultrasound transducers including a first ultrasound transducer and a second ultrasound transducer. For example, the first ultrasound transducer and/or a second ultrasound transducer are transducers of an array of transducers, such as of the one or more transducers. In one or more example audio devices, the one or more ultrasound transducers are positioned at different positions in a meeting and/or conference room. In one or more example audio devices, the one or more ultrasound transducers are arranged around the audio device in order to be able to detect movement in substantially 360° around the audio device. In one or more example audio devices, the first ultrasound transducer is configured to output ultrasound signals having a first frequency, such as a first frequency range, and the second ultrasound transducer is configured to output ultrasound signals having a second frequency, such as a second frequency range. In one or more example audio devices, each transducer has a region of detection. For example, the first ultrasound transducer has a first region of detection, the first region of detection being associated with the first frequency. For example, the second ultrasound transducer has a second region of detection, the second region of detection being associated with the second frequency.

In one or more example audio devices, the audio device is configured to determine one or more audio sources of interest based on the determination of whether the direction of arrival satisfies the position criterion. In one or more example audio devices, the audio device is configured to determine a first audio source of interest associated with the first moving object when the DOA satisfies the position criterion. In one or more example audio devices, the audio device is configured to determine a second audio source of interest associated with the second moving object when the DOA satisfies the position criterion. In one or more example audio devices, to process the audio input signal comprises to process the audio input signal based on the one or more audio sources of interest. In other words, the audio device may be configured to flag or map one or more sources of interest based on the determination of whether the direction of arrival satisfies the position criterion. For example, the audio device may be configured to target one or more sources of interest when it is determined that the direction of arrival satisfies the position criterion. An audio source of interest may for example be a user of the audio device, such as a participant at a meeting using the audio device. An audio source of interest may for example be seen as a potential audio source, such as a person being in the vicinity of the audio device but not yet speaking.

In one or more example audio devices, the ultrasound device has a detection range dependent on an output power of the ultrasound device, and wherein the position criterion is based on the detection range. In other words, the ultrasound device has a detection range dependent on an output power of the output ultrasound signal. For examples, a detection range can be seen as a distance range from the audio device within which the audio device is capable of detecting movement. In one or more example audio devices, the detection range of the ultrasound device is dependent on or proportional on an output power of the one or more ultrasound transducers. The detection range of the ultrasound device may also be associated with a width of detection of the one or more ultrasound transducers, with such width corresponding to the emission and/or propagation of ultrasound signals, such as the output and/or input ultrasound signals. It may be appreciated that the audio device may be configured to adjust the detection range by changing an output power of the output ultrasound signal. For example, the distance range may be determined based on the detection range of the ultrasound device, such as based on an output power of the ultrasound device. In one or more example audio devices, the audio device is configured to perform distance dependent processing. In other words, a certain distance range or detection range may be assigned to each ultrasound transducer. It may be appreciated that each ultrasound transducer may be assigned to a person, such as an audio source of interest. It may therefore be possible to process audio signals of persons being located at different distances and have different distance thresholds depending on the position or direction of an audio source.

In one or more example audio devices, each of the one or more ultrasound transducers have a dedicated detection range. In one or more example audio devices, the position criterion is based on the respective detection ranges of the one or more ultrasound transducers. In one or more example audio devices, each of the one or more ultrasound transducers have a dedicated detection cone. In one or more example audio devices, the dedicated cone detection is associated with a detection angle and/or a distance. Formulated differently, a dedicated detection range may be seen as a range within which an ultrasound transducer is configured to output and/or obtain ultrasound signals.

In one or more example audio devices, to process the audio input signal comprises to control a beamforming of the signal processor based on whether the direction of arrival satisfies the position criterion. In one or more example audio devices, the audio device is configured to process the audio input signal by controlling a beamforming of the signal processor based on the first position data and/or the second position data. In other words, the audio device may be configured to control the beamforming of the signal processor based on the direction of arrival when the DOA satisfies the position criterion. For example, the audio device can steer a beamformer towards the direction of arrival when the DOA satisfies the position criterion. The audio device may be configured to control a beamformer of the signal processor based on an outcome of the determination of whether the DOA satisfies the position criterion. Formulated differently, the beamforming of the signal processor may vary depending on whether the DOA satisfies the position criterion or not. In one or more example audio devices, to control a beamformer of the signal processor comprises to determine one or more beamforming coefficients to be applied to the audio output signal based on an outcome of the determination of whether the DOA satisfies the position criterion, such as in accordance with the outcome.

In one or more example audio devices, to determine position data comprises to determine a first region indicative of no movement. In one or more example audio devices, the audio device is configured to determine a first region, such as a first region in the environment of the audio device, where no movement is present. The first region may be seen as a part and/or a section of the meeting room where the audio device is positioned where the audio device is not able to detect a moving object. In one or more example audio devices, the audio device, such as the ultrasound device, can distinguish stationary objects from users, e.g., sitting still but still making small movements, due to its high sensitivity to small movements. In one or more example audio devices, the position criterion is based on the first region. The audio device may be configured to attenuate audio sources associated with the first region. The first region may be indicative of a region in the environment surrounding the audio device where no moving objects are present. By discarding audio signals coming from the direction of the first region, the audio processing of the audio device may be simplified.

In one or more example audio devices, the present disclosure provides an audio device capable of registering nonverbal cues. For example, high movement from a user can indicate its intention to speak for both video stream and audio stream.

In one or more example audio devices, to determine position data comprises to determine one or more environment dimension parameters. In one or more example audio devices, the position criterion is based on the one or more environment dimension parameters. In one or more example audio devices, an environment dimension parameter can be seen as a parameter indicative of an environment of the audio device, such as the surroundings of the audio device. For example, the environment where the audio device is positioned may comprise a room where the audio device is located, such as a conference room, a meeting room, a boardroom, a meeting hall, and an auditorium. For example, the environment where the audio device is positioned may comprise an interior of a building, such as inside environment, and/or an exterior of a building, such as an outside environment. In other words, the audio device may be located in an environment being inside a building, outside a building, and/or in a mixed environment comprising both inside parts and outside parts. An environment where the audio device is positioned may include building elements, such as walls, windows, and/or doors, objects, such as tables, chairs, lamps, and/or carpets, and/or persons, such as human beings located in the environment. The audio device may be configured to determine one or more characteristics of the environment of the audio device.

In one or more example audio devices, an environment dimension parameter can be indicative of a shape and/or a size of a room, such as the meeting and/or conference room, where the audio device is positioned. In one or more example audio devices, an environment dimension parameter can be indicative of a room mapping.

A method of operating an audio device is disclosed. The audio device comprises an interface, a memory, one or more processors comprising a signal processor, one or more speakers, one or more microphones, and an ultrasound device. The method comprises outputting an output ultrasound signal via the ultrasound device. The method comprises obtaining an input ultrasound signal via the ultrasound device. The method comprises obtaining an audio input signal via the one or more microphones. The method comprises determining, based on the audio input signal, a direction of arrival of the audio input signal. The method comprises determining, based on the input ultrasound signal and the output ultrasound signal, position data including first position data indicative of a first position of a first moving object. The method comprises determining whether the direction of arrival satisfies a position criterion based on the first position data. The method comprises processing the audio input signal based on whether the direction of arrival satisfies the position criterion for provision of an audio output signal.

It is to be understood that a description of a feature in relation to the audio device and/or the conference system is also applicable to the corresponding feature in the system(s), and/or the method(s) of operating an audio device as disclosed herein and vice versa.

It is to be understood that the wording based on as disclosed herein may be seen as or understood as: "as a function of", "as an input to", and/or "depending on". For example, determine, based on the audio input signal, a direction of arrival of the audio input signal, may be understood as determine a direction of arrival of the audio input signal as a function of the audio input signal, using the audio input signal as an input to determine a direction of arrival of the audio input signal, and/or determine a direction of arrival of the audio input signal depending on the audio input signal.

Figure 2:
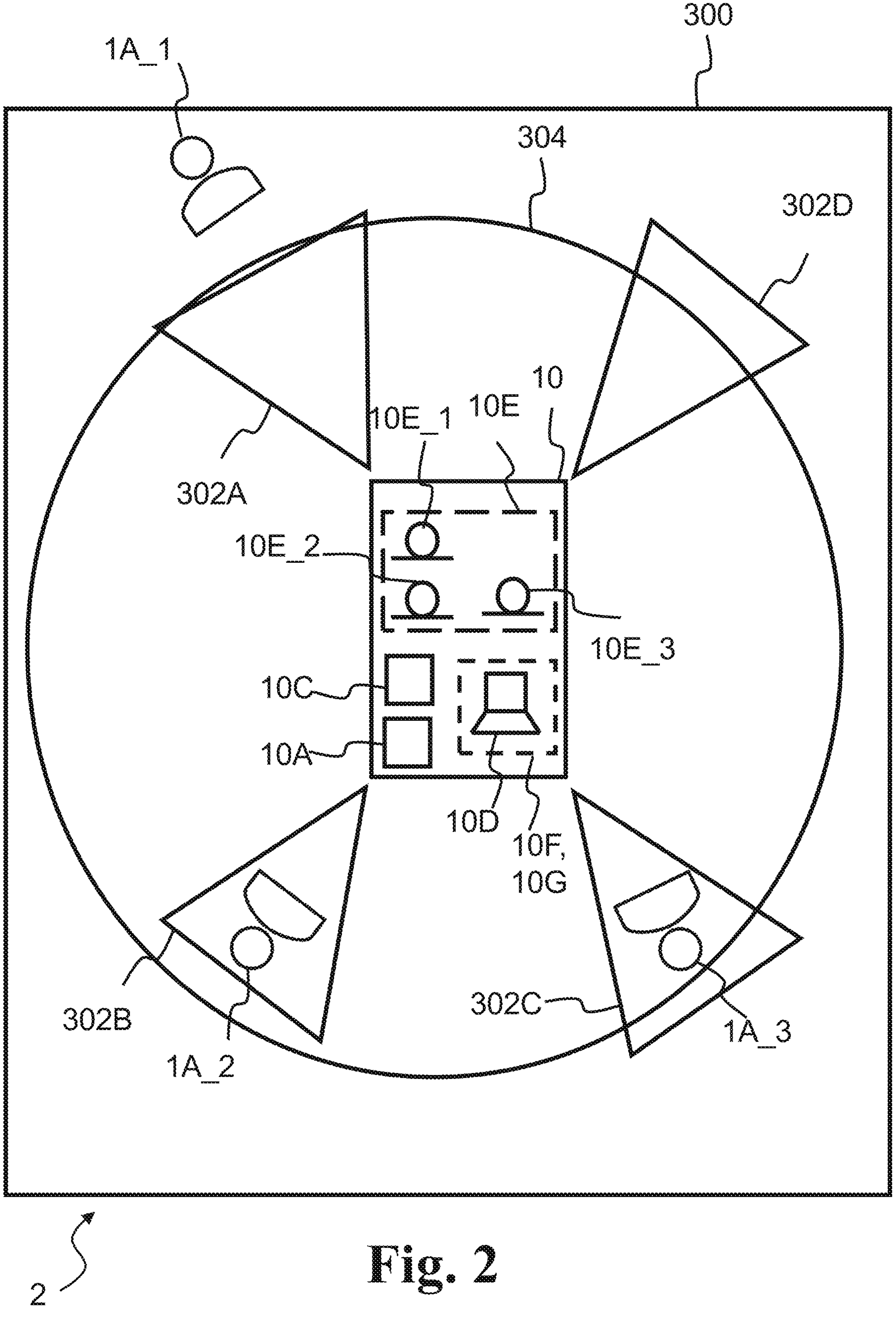

FIG. 1 schematically illustrates an audio device, such as an audio device 10 according to the present disclosure (such as the audio device 10 disclosed in FIG. 2). The audio device 10 comprises one or more processors 10C, one or more speakers 10D, one or more microphones 10E, and an ultrasound device 10F. In FIG. 1 the ultrasound device 10F is represented as being part of the one or more speakers 10D. It may be appreciated that in some examples the ultrasound device 10F may be a separate device of the audio device 10. The one or more processors 10C comprise a signal processor, such as signal processor 64.

The audio device 10 is configured to output an output ultrasound signal 52, such as a first output ultrasound signal 52A and/or a second output ultrasound signal 52B, via the ultrasound device 10F. The audio device 10 is configured to obtain an input ultrasound signal 54, such as a first input ultrasound signal 54A and/or a second input ultrasound signal 54B, via the ultrasound device 10F.

In one or more example audio devices, the ultrasound device 10F comprises one or more ultrasound transducers 10G including a first ultrasound transducer 10GA and a second ultrasound transducer 10GB. In one or more example audio devices, the first ultrasound transducer 10GA is configured to output ultrasound signals having a first frequency and the second ultrasound transducer 10GB is configured to output ultrasound signals having a second frequency.

The audio device 10 is configured to obtain an audio input signal 56, such as a first audio input signal 56A and/or a second audio input signal 56B via the one or more microphones 10E, such as a first microphone and/or a second microphone.

The audio device 10 is configured to determine, based on the audio input signal 56, a direction of arrival, DOA, of the audio input signal 56, e.g., using the one or more processors 10C. In one or more example audio devices, the one or more processors 10C comprises a DOA determination module 58 configured to determine, based on the audio input signal 56, DOAs 58A, 58B of the audio input signal 56. The DOA determination module 58 may be configured to provide the DOAs 58A, 58B to a position determination module 60. In one or more example audio devices, the DOA 58A is a first DOA, e.g., associated with the first audio input signal 56A. In one or more example audio devices, the DOA 58B is a second DOA, e.g., associated with the second audio input signal 56B.

The audio device 10 is configured to determine, based on the input ultrasound signal 54 and the output ultrasound signal 52, position data including first position data indicative of a first position of a first moving object, e.g., using the one or more processors 10C. In one or more example audio devices, the one or more processors 10C comprise a position determination module 60 configured to determine, based on the input ultrasound signal 54 and the output ultrasound signal 52, position data 60A. The position data 60A may include first position data 60AA indicative of a first position of a first moving object. For example, the first position data 60AA comprises a first distance and a first direction of the first moving object. The position data 60A may include second position data 60AB indicative of a second position of a second moving object. For example, the second position data 60AB comprise a second distance and a second direction of the second moving object. In one or more example audio devices, the first audio input signal 56A is associated with the first moving object. In one or more example audio devices, the second audio input signal 56B is associated with the second moving object. The position determination module 60 may be configured to provide the position data 60A to a matching module 62.

In one or more example audio devices, the audio device 10 is configured to determine, such as using the one or more processors 10C, e.g., the position determination module 60, one or more amplitude variations based on the input ultrasound signal 54 and the output ultrasound signal 52. For example, the one or more amplitude variations can be indicative of an object moving in an environment where the audio device is positioned, such as the first moving object and/or the second moving object. For example, the position determination module 60 is configured to determine one or more amplitude variations associated with the first moving object based on the first input ultrasound signal 54A and the first output ultrasound signal 52A. For example, audio device 10 may detect the first moving object by outputting the first output ultrasound signal 52A and obtaining the first input ultrasound signal 54A, with the first output ultrasound signal 54A being a reflected version of the first output ultrasound signal 52A when encountering the first moving object. For example, the position determination module 60 is configured to determine one or more amplitude variations associated with the second moving object based on the second input ultrasound signal 54B and the second output ultrasound signal 52B. For example, audio device 10 may detect the second moving object by outputting the second output ultrasound signal 52B and obtaining the second input ultrasound signal 54B, with the second output ultrasound signal 54B being a reflected version of the second output ultrasound signal 52B when encountering the second moving object.

In one or more example audio devices, the audio device 10 is configured to determine, such as using the one or more processors 10C, e.g., the position determination module 60, a first region 60D indicative of no movement. In one or more example audio devices, the audio device is configured to determine the first region 60D indicative of no movement using the position determination module 60. In one or more example audio devices, the position determination module 60 is configured to determine one or more environment dimension parameters 60C. The audio device is configured to determine the one or more environment dimension parameters 60C using the position determination module 60. The position determination module 60 may be configured to provide the position data 60A, the first region 60D and/or the one or more environment dimension parameters 60C to a matching module 62.

The audio device 10 is configured to determine, such as using the one or more processors 10C, whether the direction of arrival satisfies a position criterion based on the first position data. In one or more example audio devices, the one or more processors 10C comprise the matching module 62 configured to determine whether the DOA 58A satisfies a position criterion based on the first position data 60AA. In one or more example audio devices, the matching module 62 is configured to determine whether the DOA 58B satisfies a position criterion based on the second position data 60AB. The matching module 62 may be configured to provide a matching parameter 62A to the signal processor 64, the matching parameter 62A being indicative of whether the determination that the DOA 58A satisfies the position criterion. For example, the matching parameter 62A may be indicative that determination that the DOA 58A, 58B satisfies the position criterion. For example, the matching parameter 62A may be indicative that determination that the DOA 58A, 58B does not satisfy the position criterion. In one or more example audio devices, the matching module 62 is configured to determine the position criterion based on the first position data 60AA and/or the second position data 60AB. In one or more example audio devices, the matching module 62 is configured to determine the position criterion based on one or more of: the first region 60D, the one or more environment dimension parameters 60C, the first position data 60AA, and the second position data 60AB.

In one or more example audio devices, the audio device 10 is configured to determine, such as using the one or more processors 10C, e.g., the matching module 62, whether the DOA 58A is within a first direction range associated with the first direction and whether the first distance is within a distance range. In one or more example audio devices, the matching module 62 is configured to determine whether the DOA 58B is within a second direction range associated with the second direction and whether the second distance is within a distance range. In one or more example audio devices, the distance range is less or equal to 10 meters from the audio device.

In one or more example audio devices, the ultrasound device 10F has a detection range 10FA, such as a distance range, dependent on an output power of the ultrasound device 10F. In one or more example audio devices, the matching module 62 is configured to determine the position criterion based on the detection range 10FA.

In one or more example audio devices, each of the one or more ultrasound transducers 10G have a dedicated detection range 10FB. In one or more example audio devices, the matching module 62 is configured to determine the position criterion based on the respective detection ranges 10FB of the one or more ultrasound transducers 10G.

In one or more example devices, the audio device 10 is configured to determine, such as using the one or more processors 10C, e.g., the matching module 62, one or more audio sources of interest based on the determination of whether the DOAs 58A, 58B satisfies the position criterion. For example, the DOA 58A is associated with an audio source of the first moving object. For example, the DOA 58B is associated with an audio source of the second moving object.

The audio device 10 is configured to process, such as using the one or more processors 10C, the audio input signal 56 based on whether the direction of arrival satisfies the position criterion for provision of an audio output signal 68A. In one or more example audio devices, the one or more processors 10C comprises a signal processor 64 configured to process the audio input signal 56 based on whether the DOAs 58A, 58B satisfies the position criterion for provision of an audio output signal 68A.

In one or more example audio devices, the audio device is configured to process, such as using the one or more processors 10C, e.g., the signal processor 64, the audio input signal 56 based on the one or more audio sources of interest. For example, the signal processor 64 is configured to process the first audio input signal 56A based on the audio source associated with the DOA 58A. For example, the signal processor 64 is configured to process the first audio input signal 56B based on the audio source associated with the DOA 58B.

In one or more example audio devices, the audio device is configured to process, such as using the one or more processors 10C, e.g., the signal processor 64, the audio input signal 56, such as first audio input signal 56A and/or second audio input signal 56B, based on the first position data 60AA and/or the second position data 60AB.

In one or more example audio devices, the matching module 62 is configured to determine that the DOA 58A satisfies the position criterion. The signal processor 64 may be configured to receive a matching parameter 62A comprising a first matching parameter 62AA from the matching module 62, the first matching parameter 62AA being indicative of the determination that the DOA 58A satisfies the position criterion. The signal processor 64 may be configured to process the audio input signal 56 for provision of the audio output signal 68A. In one or more example audio devices, the signal processor 64 is configured to target the first moving object. For example, the signal processor 64 is configured to process an audio source associated with the DOA 58A, such as the audio source associated with the first moving object. For example, the signal processor 64 is configured to process one or more audio sources associated with the input audio signal 56 satisfying the position criterion.

For example, the signal processor 64 is configured to process the first audio input signal 56A based on the audio source associated with the DOA 58A. For example, the signal processor 64 is configured to process the first audio input signal 56B based on the audio source associated with the DOA 58B.

In one or more example audio devices, the signal processor 64 is configured to control a beamforming of the signal processor 64 based on whether the DOA 58A satisfies the position criterion. In other words, the signal processor 64 may process the first audio input signal 56A when the DOA 58A satisfies the position criterion. The audio output signal may be seen as an audio signal of interest, such as an audio signal associated with the DOA 58A satisfying the position criterion.

In one or more example audio devices, the matching module 62 is configured to determine that the DOA 58B does not satisfy the position criterion. The signal processor 64 may be configured to receive a matching parameter 62A comprising a second matching parameter 62AB from the matching module 62, the second matching parameter 62AB being indicative of the determination that the DOA 58B does not satisfy the position criterion. The signal processor 64 may be configured to process the second audio input signal 56B to attenuate an audio source associated with the DOA 58B, such as the audio source associated with the second moving object. For example, the signal processor 64 is configured to attenuate one or more audio sources associated with the input audio signal 56 not satisfying the position criterion. In one or more example audio devices, the signal processor 64 may refrain from targeting the audio source associated with the second moving object. The audio device 10 may be configured to output the audio output signal 68A to a far-end audio device, such as using the one or more processors 10C, e.g., using the signal processor 64.

FIG. 2 schematically illustrates an example scenario where the technique as disclosed herein is applied. FIG. 2 discloses an audio device, such as audio device 10 according to the present disclosure (such as audio device 10 disclosed in FIG. 1). The audio device 10 comprises one or more processors 10C, one or more speakers 10D, one or more microphones 10E, such as a first microphone 10E_1 and/or a second microphone 10E_2, and an ultrasound device 10G comprising one or more ultrasound transducers 10G. FIG. 2 illustrates a meeting room 300 comprising three participants or persons, a first participant 1A_1, a second participant 1B_2, and a third participant 1A_3 where the audio device 10 is used.

The audio device 10 is configured to output an output ultrasound signal via the ultrasound device 10F. The audio device 10 is configured to obtain an input ultrasound signal, such as a first input ultrasound signal and/or a second input ultrasound signal, via the ultrasound device 10F. In one or more example audio devices, the ultrasound device 10F comprises one or more ultrasound transducers 10G including a first ultrasound transducer and a second ultrasound transducer. In one or more example audio devices, the first ultrasound transducer is configured to output ultrasound signals having a first frequency and the second ultrasound transducer is configured to output ultrasound signals having a second frequency. In one or more example audio devices, the ultrasound device 10F comprises an array of ultrasound transducers.

The audio device 10 is configured to obtain an audio input signal, such as a first audio input signal, a second audio input signal and/or a third audio input signal via the one or more microphones 10E, such as a first microphone 10E_1, a second microphone 10E_2, and/or a third microphone 10E_3. For example, the first audio input signal, the second audio input signal and/or the third audio input signal may be combined and be seen as the first audio input signal.

In one or more example audio devices, an audio input signal may be indicative of an audio signal generated by user(s), such as the first participant 1A_1, the second participant 1B_2, and/or the third participant 1A_3, of the audio device 10 in the meeting room 300. In other words, the first participant 1A_1, the second participant 1B_2, and/or the third participant 1A_3 may be seen as speakers. The first participant 1A_1, the second participant 1B_2, and/or the third participant 1A_3 may take turns at speaking in the meeting room 300 or may speak at the same time. In one or more example audio devices, an audio input signal may be indicative of an audio signal generated by the user(s) of the audio device 10 while using the audio device 10 in the meeting room 300. In one or more example audio devices, the first audio input signal is indicative of an audio signal generated by the first participant 1A_1. In one or more example audio devices, the second audio input signal is indicative of an audio signal generated by the second participant 1A_2. In one or more example audio devices, the third audio input signal is indicative of an audio signal generated by the third participant 1A_3. Optionally, an audio input signal can be indicative of an audio signal generated by a user located outside the meeting room, such as not using the audio device 10.

The meeting room 300 may be seen as room where a meeting between two or more parties is occurring, with the two or more parties being located remotely from each other. In other words, the audio device 10 may be seen as a conference speakerphone, e.g., configured to be used by a party (such as one or more users and/or participants at a near-end) to communicate with one or more other parties (such as one or more users and/or participants at a far-end). The audio device 10 may be used for a conference and/or a meeting between two or more parties being remote from each other. The meeting room 300 is the room where the audio device 10 is located, such as at the near-end. The audio device 10 may be used by one or more users, such as the first participant 1A_1, the second participant 1A_2, and/or the third participant 1A_3, in a vicinity of where the audio device 10 is located, also referred to as a near-end and/or the meeting room 300.

In one or more example audio devices, the audio device 10 is configured to determine, using the one or more processors 10C and based on the audio input signal, a DOA associated with the audio input signal. In one or more example audio devices, the audio device 10 is configured to determine a first DOA, a second DOA and/or a third DOA associated with the first audio input signal, the second audio input signal and/or the third audio input signal, respectively.

In one or more example audio devices, the audio device 10 is configured to determine, using the one or more processors 10C and based on the input ultrasound signal and the output ultrasound signal, position data. In one or more example audio devices, the ultrasound device allows detection of movement of a user using the audio device 10. In one or more example audio devices, the audio device 10 is configured to determine, using the one or more processors 10C and based on the first input ultrasound signal and the first output ultrasound signal, position data including first position data. The position data may include first position data indicative of a first position of a first moving object, such as the first participant 1A_1. For example, the first position data comprises a first distance and a first direction of the first participant 1A_1. In one or more example audio devices, the audio device 10 is configured to determine, using the one or more processors 10C and based on the second input ultrasound signal and the second output ultrasound signal, position data including second position data. The position data may include second position data indicative of a second position of a second moving object, such as the second participant 1A_2. For example, the second position data comprises a second distance and a second direction of the second participant 1A_2. In one or more example audio devices, the audio device 10 is configured to determine, using the one or more processors 10C and based on the third input ultrasound signal and the third output ultrasound signal, position data including third position data. The position data may include third position data indicative of a third position of a third moving object, such as the third participant 1A_3. For example, the third position data comprises a third distance and a third direction of the third participant 1A_3.

In one or more example audio devices, the audio device 10 is configured to determine one or more amplitude variations based on the input ultrasound signal and the output ultrasound signal and using the one or more processors 10C. For example, the one or more amplitude variations can be indicative of a movement of a participant positioned in the meeting room. For example, the audio device 10 is configured to determine one or more amplitude variations associated with the first participant 1A_1 based on the first input ultrasound signal and the first output ultrasound signal and using one or more processors 10C. For example, the audio device 10 may detect the first participant 1A_1 by outputting the first output ultrasound signal and obtaining the first input ultrasound signal, with the first output ultrasound signal being a reflected version of the first output ultrasound signal when encountering the first participant 1A_1. For example, the audio device 10 is configured to determine one or more amplitude variations associated with the second participant 1A_2 based on the second input ultrasound signal and the second output ultrasound signal and using the one or more processors 10C. For example, the audio device 10 may detect the second participant 1A_2 by outputting the second output ultrasound signal and obtaining the second input ultrasound signal, with the second output ultrasound signal being a reflected version of the second output ultrasound signal when encountering the second participant 1A_2. For example, the audio device 10 is configured to determine one or more amplitude variations associated with the third participant 1A_3 based on the third input ultrasound signal and the third output ultrasound signal and using the one or more processors 10C. For example, the audio device 10 may detect the third participant 1A_3 by outputting the third output ultrasound signal and obtaining the third input ultrasound signal, with the third output ultrasound signal being a reflected version of the third output ultrasound signal when encountering the third participant 1A_3.

In one or more example audio devices, the audio device 10 is configured to determine a first region indicative of no movement using the one or more processors 10C. In one or more example audio devices, the audio device 10 is configured to determine one or more environment dimension parameters using the one or more processors 10C. An environment dimension parameter may be seen as an environment of the audio device, such as the surroundings of the audio device. For example, the environment where the audio device is positioned may comprise a room where the audio device is located, such as the meeting room 300. In one or more example audio devices, an environment dimension parameter can be indicative of a shape and/or a size of the meeting room 300. In one or more example audio devices, an environment dimension parameter can be indicative of a room mapping.

In one or more example audio devices, the audio device 10 is configured to determine whether the DOA of the input audio signal satisfies a position criterion based on the first position data. For example, the audio device 10 is configured to determine whether the first DOA of the first input audio signal satisfies a position criterion based on the first position data. For example, the audio device 10 is configured to determine whether the second DOA of the second input audio signal satisfies a position criterion based on the first position data. For example, the audio device 10 is configured to determine whether the third DOA of the third input audio signal satisfies a position criterion based on the third position data. In one or more example audio devices, the audio device 10 is configured to determine the position criterion based on one or more of: the first region, the one or more environment dimension parameters, the first position data, the second position data, and the third position data.

In one or more example audio devices, the audio device 10 is configured to determine whether the first DOA is within a first direction range associated with the first direction and whether the first distance is within a distance range 304. In one or more example audio devices, the audio device 10 is configured to determine whether the second DOA is within a second direction range associated with the second direction and whether the second distance is within the distance range 304. In one or more example audio devices, the audio device 10 is configured to determine whether the third DOA is within a third direction range associated with the third direction and whether the third distance is within a distance range 304. In one or more example audio devices, the distance range 304 can be less or equal to 10 meters from the audio device 10. In one or more example audio devices, the distance range may be associated with a distance threshold. For example, the distance range 304 can be seen as a bubble distance, such as a distance from the audio device. The distance range 304 may be associated with a circular shape, such as a circular bubble, such that the distance threshold is the boundary of the circular shape. The distance range 304 may be associated with any other suitable shape.

In one or more example audio devices, the ultrasound device 10F has a detection range, such as distance range 304, dependent on an output power of the ultrasound device 10F. In one or more example audio devices, the audio device 10 is configured to determine the position criterion based on the detection range 10. In one or more example audio devices, each of the one or more ultrasound transducers 10G have a dedicated detection range, such as first dedicated detection range 302A, second dedicated detection range 302B, third dedicated detection range 302C, fourth dedicated detection range 302D. For example, a dedicated detection range may be seen as a dedicated detection code. The dedicated cone detection may be associated with a width for enabling propagation of ultrasound signals. In one or more example audio devices, the first dedicated detection range 302A is associated with the first participant 1A_2. In one or more example audio devices, the second dedicated detection range 302B is associated with the second participant 1A_2. In one or more example audio devices, the third dedicated detection range 302C is associated with the third participant 1A_3. In one or more example audio devices, the fourth dedicated detection range 302D is not associated with any other participant as the ultrasound device has not detected it. In other words, a fourth output ultrasound signal may not have encountered a fourth moving object, such as a fourth participant. In one or more example audio devices, the audio device 10 is configured to determine the position criterion based on the respective detection ranges, such as first dedicated detection range 302A, the second dedicated detection range 302B, and/or the third dedicated detection range 302C, of the one or more ultrasound transducers 10G. In one or more example audio devices, the distance range 304 can be determined based on the output power of the ultrasound device 10F and/or the one or more ultrasound transducers 10G.

In one or more example devices, the audio device 10 is configured to determine one or more audio sources of interest based on the determination of whether the DOA, such as the first DOA, the second DOA, and/or the third DOA, satisfies the position criterion. For example, the first DOA is associated with an audio source of the first participant 1A_1. For example, the second DOA is associated with an audio source of the second participant 1A_2. For example, the third DOA is associated with an audio source of the third participant 1A_3.

In one or more example audio devices, the audio device 10 is configured to process the audio input signal based on whether the DOA, such as the first DOA, the second DOA, and/or the third DOA, satisfies the position criterion for provision of an audio output signal.

In one or more example audio devices, the audio device 10 is configured to process the audio input signal based on the one or more audio sources of interest. For example, the audio device is configured to process the first audio input signal based on the audio source associated with the first DOA, such as associated with the first participant 1A_1. For example, the audio device is configured to process the second audio input signal based on the audio source associated with the second DOA, such as associated with the second participant 1A_2. For example, the audio device is configured to process the third audio input signal based on the audio source associated with the third DOA, such as associated with the third participant 1A_3.

In one or more example audio devices, the audio device 10 is configured to process the audio input signal, such as first audio input signal, the second audio input signal 56B and/or the third audio input signal, based on the first position data, the second position data and/or the third position data.

In one or more example audio devices, the audio device 10 is configured to determine that the second DOA and third DOA satisfies the position criterion. For example, the audio device 10 is configured to determine that the first DOA is within the first direction range associated with the first direction and that the first distance is within the distance range 304, such as a direction and/or a distance in view of audio device. For example, the audio device 10 is configured to determine that the third DOA is within the third direction range associated with the third direction and that the third distance is within the distance range 304, such as a direction and/or a distance in view of audio device. In other words, the second participant 1A_2 and the third participant 1A_2 may be positioned within the second dedicated detection range 302B and the third dedicated detection range 302C respectively.

The audio device 10 is configured to process the second audio input signal and the third audio input signal upon determining that the second DOA and the third DOA satisfy the position criterion for provision of an audio output signal.

In one or more example audio devices, the audio device 10 is configured to target the second participant 1A_2 and the third participant 1A_3. For example, the audio device 10 is configured to forward the second audio input signal and the third audio input signal to the signal processor for being processed.

For example, the audio device 10 is configured to process one or more audio sources associated with the input audio signal satisfying the position criterion. For example, the audio device 10 is configured to process the second audio input signal based on the audio source associated with the second DOA. For example, the audio device 10 is configured to process the third audio input signal based on the audio source associated with the third DOA. In other words, the audio device 10 is configured to such as target one or more parts of the audio input signal, such as the second audio input signal and the third audio input signal, coming from a direction of arrival, such as from the second DOA and the third DOA.

In one or more example audio devices, the audio device 10 is configured to control a beamforming of the signal processor based on whether the second DOA and the third DOA satisfies the position criterion. In other words, the audio device 10 may adapt the second audio input signal and the third audio input signal when the second DOA and third DOA satisfy the position criterion. The audio output signal may be seen as an audio signal of interest, such as an audio signal associated with the second DOA and third DOA satisfying the position criterion.

In one or more example audio devices, the audio device 10 is configured to determine that the first DOA does not satisfy the position criterion. In one or more example audio devices, the audio device 10 is configured to attenuate an audio source associated with the first DOA, such as the audio source associated with the first participant 1A_1. The audio device 10 is configured to attenuate the first audio input signal from the audio input signal upon determining that the first DOA does not satisfy the position criterion.

For example, the audio device 10 is configured to attenuate one or more audio sources associated with the input audio signal not satisfying the position criterion. In one or more example audio devices, the audio device 10 is configured to filter out parts of the audio input signal, such as the first audio input signal, not coming from a direction of arrival, such as from the first DOA.

Figure 3A:
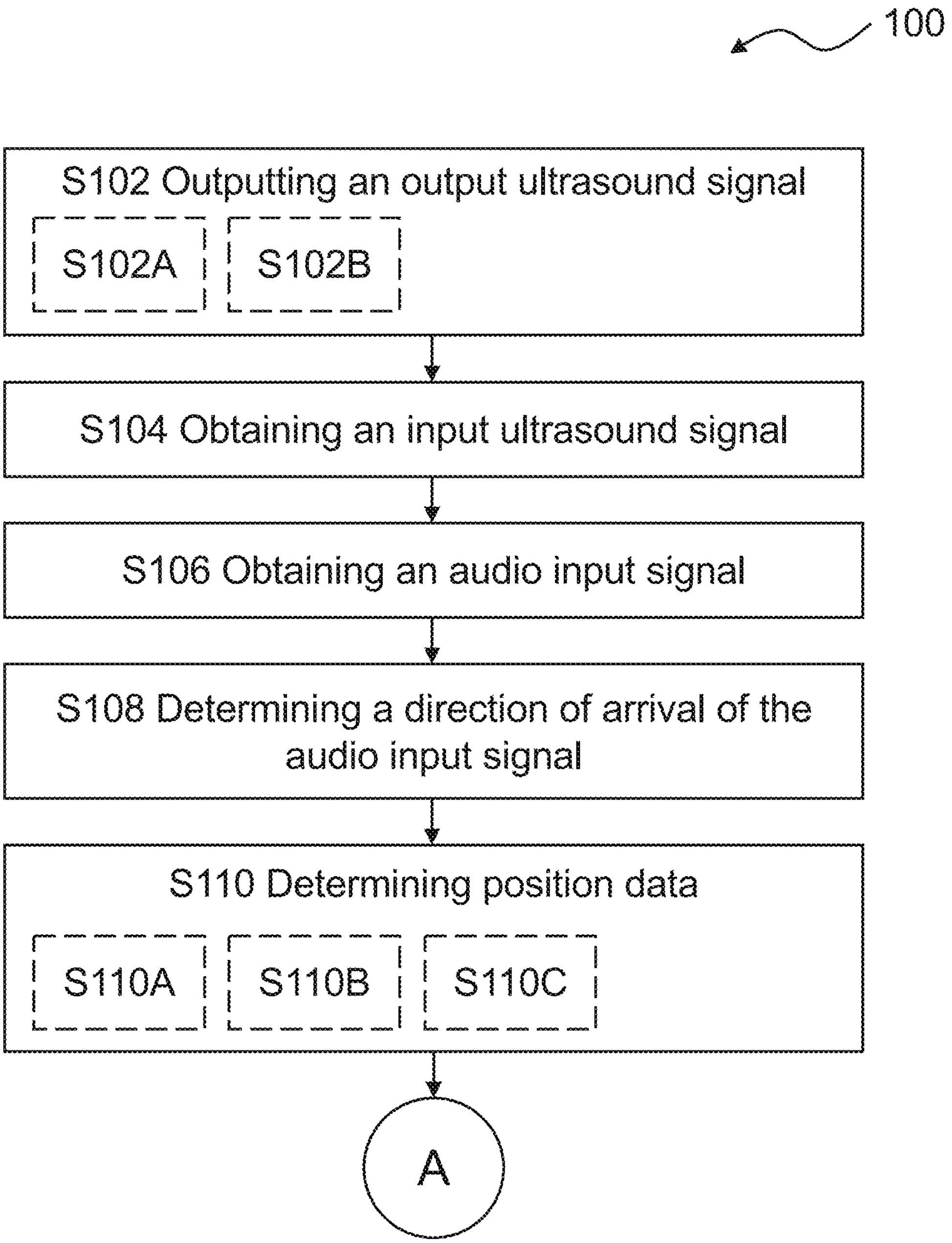
FIGS. 3A-3B show a flow-chart of an example method according to the present disclosure.
Figure 3B:
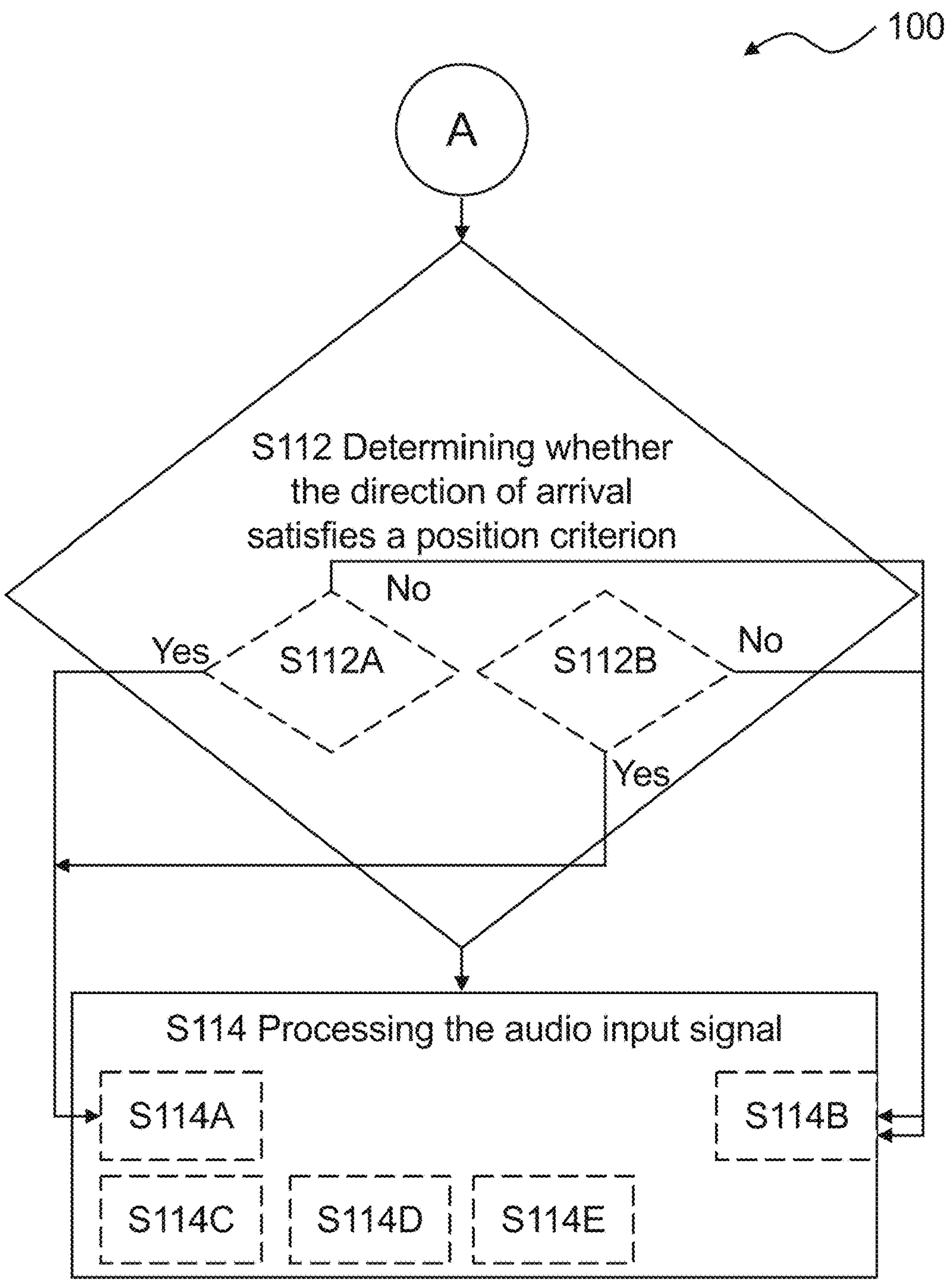

The audio device 10 may be configured to perform any of the methods disclosed in FIGS. 3A-3B.

The processor 10C is optionally configured to perform any of the operations disclosed in FIGS. 3A-3B (such as any one or more of S102, S103A, S103B, S104, S106, S108, S110, S110A, S110B, S110C, S112, S112A, S112B, S114, S114A, S114B, S114C, S114D, S114E). The operations of the audio device 10 may be embodied in the form of executable logic routines (for example, lines of code, software programs, etc.) that are stored on a non-transitory computer readable medium (for example, memory 10A) and are executed by the processor 10C.

Furthermore, the operations of the audio device 10 may be considered a method that the audio device 10 is configured to carry out. Also, while the described functions and operations may be implemented in software, such functionality may as well be carried out via dedicated hardware or firmware, or some combination of hardware, firmware and/or software.

Memory 10A may be one or more of a buffer, a flash memory, a hard drive, a removable media, a volatile memory, a non-volatile memory, a random access memory (RAM), and any other suitable device. In a typical arrangement, memory 10A may include a non-volatile memory for long term data storage and a volatile memory that functions as system memory for the processor 10C. The memory 10A may exchange data with the processor 10C over a data bus. Control lines and an address bus between the memory 10B and the processor 10C also may be present (not shown in FIG. 1). The memory 10A is considered a non-transitory computer readable medium.

The memory 10A may be configured to store information such as input ultrasound signal, audio input signal, distance of arrival, position data as disclosed herein in a part of the memory.

The system 2 may be configured to perform any of the methods disclosed in FIGS. 3A-3B.

Furthermore, the operations of the system 2 may be considered a method that the system 2 is configured to carry out. Also, while the described functions and operations may be implemented in software, such functionality may as well be carried out via dedicated hardware or firmware, or some combination of hardware, firmware and/or software.

FIGS. 3A-3B show a flow-chart of an example method, such as a method 100. A method 100 of operating an audio device is disclosed, such as an audio device as disclosed herein (e.g., audio device 10 of FIG. 1 and FIG. 2).

The method 100 comprises outputting S102 an output ultrasound signal via the ultrasound device. The method 100 comprises obtaining S104 an input ultrasound signal via the ultrasound device. The method 100 comprises obtaining S106 an audio input signal via the one or more microphones. The method 100 comprises determining S108, based on the audio input signal, a direction of arrival of the audio input signal. The method 100 comprises determining S110, based on the input ultrasound signal and the output ultrasound signal, position data including first position data indicative of a first position of a first moving object. The method 100 comprises determining S112 whether the direction of arrival satisfies a position criterion based on the first position data. The method 100 comprises processing S114 the audio input signal based on whether the direction of arrival satisfies the position criterion for provision of an audio output signal.

In one or more example methods, processing S114 the audio input signal comprises, in accordance with the direction of arrival satisfying the position criterion, the method 100 comprises targeting S114A an audio source associated with the direction of arrival.

In one or more example methods, processing S114 the audio input signal comprises, in accordance with the direction of arrival not satisfying the position criterion, the method comprises attenuating S114B an audio source associated with the direction of arrival.

In one or more example methods, the first position data comprises a first distance and a first direction of the first moving object.

In one or more example methods, determining S112 whether the direction of arrival satisfies the position criterion comprises determining S112A whether the direction of arrival is within a first direction range associated with the first direction and whether the first distance is within a distance range. In one or more example methods, in accordance with the determination S112A that the direction of arrival is within a first direction range associated with the first direction and that the first distance is within a distance range, the method 100 comprises targeting S114A an audio source associated with the direction of arrival. In one or more example methods, in accordance with the determination S112A that the direction of arrival is not within a first direction range associated with the first direction and that the first distance is not within a distance range, the method 100 comprises attenuating S114B an audio source associated with the direction of arrival.

In one or more example methods, the position data comprises second position data indicative of a second position of a second moving object. In one or more example methods, the second position data comprise a second distance and a second direction of the second moving object.

In one or more example methods, determining S112 whether the direction of arrival satisfies the position criterion comprises determining S112B whether the direction of arrival is within a second direction range associated with the second direction and whether the second distance is within a distance range. In one or more example methods, in accordance with the determination S112B that the direction of arrival is within a second direction range associated with the second direction and that the second distance is within a distance range, the method 100 comprises targeting S114A an audio source associated with the direction of arrival. In one or more example methods, in accordance with the determination S112B that the direction of arrival is not within a second direction range associated with the second direction and that the second distance is not within a distance range, the method 100 comprises attenuating S114B an audio source associated with the direction of arrival.

In one or more example methods, the distance range is less or equal to 10 meters from the audio device.

In one or more example methods, determining S110 the position data comprises determining S110A one or more amplitude variations based on the input ultrasound signal and the output ultrasound signal.

In one or more example methods, the ultrasound device comprises one or more ultrasound transducers including a first ultrasound transducer and a second ultrasound transducer. In one or more example methods, the method comprises outputting S102A ultrasound signals having a first frequency via the first ultrasound transducer and outputting S102B ultrasound signals having a second frequency via the second ultrasound transducer.

In one or more example methods, the method comprises determining S113 one or more audio sources of interest based on the determination of whether the direction of arrival satisfies the position criterion. In one or more example methods, processing S114 the audio input signal comprises processing S114C the audio input signal based on the one or more audio sources of interest.

In one or more example methods, the method comprises determining S111 the position criterion based on the first distance and the first direction.

In one or more example methods, the processing of the audio input signal is based on the first position data and/or the second position data.

In one or more example methods, processing S114 the audio input signal comprises targeting S114D the first moving object and/or the second moving object.

In one or more example methods, processing S114 the audio input signal comprises controlling S114E a beamforming of the signal processor based on whether the direction of arrival satisfies the position criterion.

In one or more example methods, determining S110 position data comprises determining S110B a first region indicative of no movement. In one or more example methods, the position criterion is based on the first region.

In one or more example methods, determining position data S110 comprises determining S110C one or more environment dimension parameters. In one or more example methods, the position criterion is based on the one or more environment dimension parameters.

Examples of audio devices, systems, and methods according to the disclosure are set out in the following items:

Item 1. Audio device comprising an interface, a memory, one or more processors comprising a signal processor, one or more speakers, one or more microphones, and an ultrasound device, wherein the audio device is configured to:

- output an output ultrasound signal via the ultrasound device;
- obtain an input ultrasound signal via the ultrasound device;
- obtain an audio input signal via the one or more microphones;
- determine, based on the audio input signal, a direction of arrival of the audio input signal;
- determine, based on the input ultrasound signal and the output ultrasound signal, position data including first position data indicative of a first position of a first moving object;
- determine whether the direction of arrival satisfies a position criterion based on the first position data; and
- process the audio input signal based on whether the direction of arrival satisfies the position criterion for provision of an audio output signal.

Item 2. The audio device according to item 1, wherein to process the audio input signal comprises, in accordance with the direction of arrival satisfying the position criterion, to target an audio source associated with the direction of arrival.

Item 3. The audio device according to item 1, wherein to process the audio input signal comprises, in accordance with the direction of arrival not satisfying the position criterion, to attenuate an audio source associated with the direction of arrival.

Item 4. The audio device according to any of the previous items, wherein the first position data comprises a first distance and a first direction of the first moving object.

Item 5. The audio device according to item 4, wherein to determine whether the direction of arrival satisfies the position criterion comprises to determine whether the direction of arrival is within a first direction range associated with the first direction and whether the first distance is within a distance range.

Item 6. The audio device according to any of the previous items, wherein the position data comprises second position data indicative of a second position of a second moving object, wherein the second position data comprise a second distance and a second direction of the second moving object.

Item 7. The audio device according to item 6, wherein to determine whether the direction of arrival satisfies the position criterion comprises to determine whether the direction of arrival is within a second direction range associated with the second direction and whether the second distance is within a distance range.

Item 8. The audio device according to any of items 5-7, wherein the distance range is less or equal to 10 meters from the audio device.

Item 9. The audio device according to any of the previous items, wherein to determine the position data comprises to determine one or more amplitude variations based on the input ultrasound signal and the output ultrasound signal.

Item 10. The audio device according to any of the previous items, wherein the ultrasound device comprises one or more ultrasound transducers including a first ultrasound transducer and a second ultrasound transducer, and wherein the first ultrasound transducer is configured to output ultrasound signals having a first frequency and the second ultrasound transducer is configured to output ultrasound signals having a second frequency.

Item 11. The audio device according to any of the previous items, wherein the audio device is configured to determine one or more audio sources of interest based on the determination of whether the direction of arrival satisfies the position criterion, and wherein to process the audio input signal comprises to process the audio input signal based on the one or more audio sources of interest.

Item 12. The audio device according to any of items 4-11, wherein the audio device is configured to determine the position criterion based on the first distance and the first direction.

Item 13. The audio device according to any of the previous items or any of items 6-12, wherein the processing of the audio input signal is based on the first position data and/or the second position data.

Item 14. The audio device according to item 13, wherein to process the audio input signal comprises to target the first moving object and/or the second moving object.

Item 15. The audio device according to any of the previous items, wherein the ultrasound device has a detection range dependent on an output power of the ultrasound device, and wherein the position criterion is based on the detection range.

Item 16. The audio device according to any of items 10-14, wherein each of the one or more ultrasound transducers have a dedicated detection range, and wherein the position criterion is based on the respective detection ranges of the one or more ultrasound transducers.

Item 17. The audio device according to any of the previous items, wherein to process the audio input signal comprises to control a beamforming of the signal processor based on whether the direction of arrival satisfies the position criterion.

Item 18. The audio device according to any of the previous items, wherein to determine position data comprises to determine a first region indicative of no movement, and wherein the position criterion is based on the first region.

Item 19. The audio device according to any of the previous items, wherein to determine position data comprises to determine one or more environment dimension parameters, and wherein the position criterion is based on the one or more environment dimension parameters.

Item 20. A conference system comprising an audio device according to any of items 1-17, and one or more ultrasound transducers.

Item 21. A method of operating an audio device comprising an interface, a memory, one or more processors comprising a signal processor, one or more speakers, one or more microphones, and an ultrasound device, the method comprising:

outputting an output ultrasound signal via the ultrasound device;

obtaining an input ultrasound signal via the ultrasound device;

obtaining an audio input signal via the one or more microphones;

determining, based on the audio input signal, a direction of arrival of the audio input signal;

determining, based on the input ultrasound signal and the output ultrasound signal, position data including first position data indicative of a first position of a first moving object;

determining whether the direction of arrival satisfies a position criterion based on the first position data; and processing the audio input signal based on whether the direction of arrival satisfies the position criterion for provision of an audio output signal.

Item 22. The method of operating an audio device according to item 21, wherein processing the audio input signal comprises, in accordance with the direction of arrival satisfying the position criterion, targeting an audio source associated with the direction of arrival.

Item 23. The method of operating an audio device according to item 22, wherein processing the audio input signal comprises, in accordance with the direction of arrival not satisfying the position criterion, attenuating an audio source associated with the direction of arrival.

Item 24. The method of operating an audio device according to any of items 21-23, wherein the first position data comprises a first distance and a first direction of the first moving object.

Item 25. The method of operating an audio device according to item 24, wherein determining whether the direction of arrival satisfies the position criterion comprises determining whether the direction of arrival is within a first direction range associated with the first direction and whether the first distance is within a distance range.

Item 26. The method of operating an audio device according to any of items 21-25, wherein the position data comprises second position data indicative of a second position of a second moving object, wherein the second position data comprise a second distance and a second direction of the second moving object.

Item 27. The method of operating an audio device according to item 26, wherein determining whether the direction of arrival satisfies the position criterion comprises determining whether the direction of arrival is within a second direction range associated with the second direction and whether the second distance is within a distance range.

Item 28. The method of operating an audio device according to any of items 25-27, wherein the distance range is less or equal to 10 meters from the audio device.

Item 29. The method of operating an audio device according to any of items 21-28, wherein determining the position data comprises determining one or more amplitude variations based on the input ultrasound signal and the output ultrasound signal.

Item 30. The method of operating an audio device according to any of items 21-29, wherein the ultrasound device comprises one or more ultrasound transducers including a first ultrasound transducer and a second ultrasound transducer, wherein the method comprises outputting ultrasound signals having a first frequency via the first ultrasound transducer and outputting ultrasound signals having a second frequency via the second ultrasound transducer.

Item 31. The method of operating an audio device according to any of items 21-30, wherein the method comprises determining one or more audio sources of interest based on the determination of whether the direction of arrival satisfies the position criterion, and wherein processing the audio input signal comprises processing the audio input signal based on the one or more audio sources of interest.

Item 32. The method of operating an audio device according to any of items 24-31, wherein the method comprises determining the position criterion based on the first distance and the first direction.

Item 33. The method of operating an audio device according to any of items 21-32 or any of items 26-32, wherein the processing of the audio input signal is based on the first position data and/or the second position data.

Item 34. The method of operating an audio device according to item 33, wherein processing the audio input signal comprises targeting the first moving object and/or the second moving object.

Item 35. The method of operating an audio device according to any of items 21-34, wherein processing the audio input signal comprises controlling a beamforming of the signal processor based on whether the direction of arrival satisfies the position criterion.

Item 36. The method of operating an audio device according to any of items 21-35, wherein determining position data comprises determining a first region indicative of no movement, and wherein the position criterion is based on the first region.

Item 37. The method of operating an audio device according to any of the items 21-36, wherein determining position data comprises determining one or more environment dimension parameters, and wherein the position criterion is based on the one or more environment dimension parameters.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the Figures comprise some circuitries or operations which are illustrated with a solid line and some circuitries, components, features, or operations which are illustrated with a dashed line. Circuitries or operations which are comprised in a solid line are circuitries, components, features, or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

LIST OF REFERENCES

2 conference system
10 audio device
10A memory
10B one or more interfaces
10C one or more processors
10D one or more speakers
10E one or more microphones
10E_1 first microphone
10E_2 second microphone
10F ultrasound device
10FA detection range
10FB dedicated detection range
10G one or more ultrasound transducers
10GA first ultrasound transducer
10GB second ultrasound transducer
52 output ultrasound signal
52A first output ultrasound signal
52B second output ultrasound signal
54 input ultrasound signal
54A first input ultrasound signal
54B second input ultrasound signal
56 audio input signal
56A first audio input signal
56B second audio input signal
58 direction of arrival determination module
58A first direction of arrival
58B second direction of arrival
60 position determination module

60A position data
60AA first position data
60AB second position data
60C one or more environment parameters
60D first region
62 matching module
62A matching parameter
62AA first matching parameter
62AB second matching parameter
64 signal processor
68A audio output signal
300 meeting room
302A first dedicated detection range
302B second dedicated detection range
302C third dedicated detection range
302C fourth dedicated detection range
304 distance range
1A_1 first participant
1A_2 second participant
1A_3 third processor
100 Method of operating an audio device
S102 Outputting an output ultrasound signal
S104 Obtaining an input ultrasound signal
S106 Obtaining an audio input signal
S108 Determining a direction of arrival
S110 Determining position data
S111 Determining a position criterion
S112 Determining whether the direction of arrival satisfies the position criterion
S113 Determining one or more audio sources of interest
S114 Processing the audio input signal

The invention claimed is:

1. An audio device comprising an interface, a memory, one or more processors comprising a signal processor, one or more speakers, one or more microphones, and an ultrasound device, wherein the audio device is configured to:

output an output ultrasound signal via the ultrasound device;

obtain an input ultrasound signal via the ultrasound device;

obtain an audio input signal via the one or more microphones;

determine, based on the audio input signal, a direction of arrival of the audio input signal;

determine, based on the input ultrasound signal and the output ultrasound signal, position data including first position data indicative of a first position of a first moving object, wherein the first position data comprises a first distance and a first direction of the first moving object;

determine whether the direction of arrival satisfies a position criterion based on the first position data; and process the audio input signal based on whether the direction of arrival satisfies the position criterion for provision of an audio output signal.

2. The audio device according to claim 1, wherein to process the audio input signal comprises, in accordance with the direction of arrival satisfying the position criterion, to target an audio source associated with the direction of arrival.

3. The audio device according to claim 1, wherein to determine whether the direction of arrival satisfies the position criterion comprises to determine whether the direction of arrival is within a first direction range associated with the first direction and whether the first distance is within a distance range.

4. The audio device according to claim 1, wherein the position data comprises second position data indicative of a second position of a second moving object, wherein the second position data comprise a second distance and a second direction of the second moving object.

5. The audio device according to claim 4, wherein to determine whether the direction of arrival satisfies the position criterion comprises to determine whether the direction of arrival is within a second direction range associated with the second direction and whether the second distance is within a distance range.

6. The audio device according to claim 1, wherein the ultrasound device comprises one or more ultrasound transducers including a first ultrasound transducer and a second ultrasound transducer, and wherein the first ultrasound transducer is configured to output ultrasound signals having a first frequency and the second ultrasound transducer is configured to output ultrasound signals having a second frequency.

7. The audio device according to claim 1, wherein the audio device is configured to determine one or more audio sources of interest based on the determination of whether the direction of arrival satisfies the position criterion, and wherein to process the audio input signal comprises to process the audio input signal based on the one or more audio sources of interest.

8. The audio device according to claim 1, wherein the audio device is configured to determine the position criterion based on the first distance and the first direction.

9. The audio device according to claim 4, wherein the processing of the audio input signal is based on the first position data and/or the second position data.

10. The audio device according to claim 1, wherein the ultrasound device has a detection range dependent on an output power of the ultrasound device, and wherein the position criterion is based on the detection range.

11. The audio device according to claim 6, wherein each of the one or more ultrasound transducers have a dedicated detection range, and wherein the position criterion is based on the respective detection ranges of the one or more ultrasound transducers.

12. The audio device according to claim 1, wherein to determine position data comprises to determine a first region indicative of no movement, and wherein the position criterion is based on the first region.

13. The audio device according to claim 1, wherein to determine position data comprises to determine one or more environment dimension parameters, and wherein the position criterion is based on the one or more environment dimension parameters.

14. A conference system comprising an audio device according to claim 1, and one or more ultrasound transducers.

15. A method of operating an audio device comprising an interface, a memory, one or more processors comprising a signal processor, one or more speakers, one or more microphones, and an ultrasound device, the method comprising:

outputting an output ultrasound signal via the ultrasound device;

obtaining an input ultrasound signal via the ultrasound device;

obtaining, using the audio device, an audio input signal via the one or more microphones;

determining, based on the audio input signal, a direction of arrival of the audio input signal;

determining, based on the input ultrasound signal and the output ultrasound signal, position data including first position data indicative of a first position of a first moving object, wherein the first position data comprises a first distance and a first direction of the first moving object;

determining whether the direction of arrival satisfies a position criterion based on the first position data; and processing the audio input signal based on whether the direction of arrival satisfies the position criterion for provision of an audio output signal.

* * * * *